(12) United States Patent
Chalk et al.

(10) Patent No.: US 11,779,151 B2
(45) Date of Patent: Oct. 10, 2023

(54) DOSING TOOL

(71) Applicant: Breville Pty Limited, Alexandria (AU)

(72) Inventors: Simon James Chalk, Redfern (AU); Andrew John Grigor, Kensington (AU)

(73) Assignee: BREVILLE PTY LIMITED, Alexandria (AU)

( * ) Notice: Subject to any disclaimer, the term of this patent is extended or adjusted under 35 U.S.C. 154(b) by 914 days.

(21) Appl. No.: 15/123,672

(22) PCT Filed: Mar. 19, 2015

(86) PCT No.: PCT/AU2015/000131
§ 371 (c)(1),
(2) Date: Sep. 6, 2016

(87) PCT Pub. No.: WO2015/131239
PCT Pub. Date: Sep. 11, 2015

(65) Prior Publication Data
US 2017/0079466 A1   Mar. 23, 2017

(30) Foreign Application Priority Data
Mar. 6, 2014 (AU) .................. 2014900757

(51) Int. Cl.
*A47J 31/44* (2006.01)
*A47J 31/06* (2006.01)

(52) U.S. Cl.
CPC ........... *A47J 31/44* (2013.01); *A47J 31/0626* (2013.01); *A47J 31/0657* (2013.01); *A47J 31/0663* (2013.01); *A47J 2031/0694* (2013.01); *A47J 2203/00* (2013.01)

(58) Field of Classification Search
CPC ............ A47J 2031/0694; A47J 2203/00; A47J 31/0626; A47J 31/0657; A47J 31/0663; A47J 31/44; A47J 31/40–42; A47J 43/288; A47J 45/10; A47J 43/04; A47J 19/02; A47J 19/023; A47J 19/027; A47J 31/22; A47J 43/06; A47J 43/0722; A47J 43/044;
(Continued)

(56) References Cited

U.S. PATENT DOCUMENTS 2,783,537 A * 3/1957 Gringer .................. B27G 17/04
30/320
3,448,518 A * 6/1969 Sklar ...................... B26B 5/002
30/162
(Continued)

FOREIGN PATENT DOCUMENTS

CN   101203163 A   6/2008
CN   101355898 A   1/2009
(Continued)

OTHER PUBLICATIONS

English Translation of CN-204600040-U (Year: 2015).*
(Continued)

*Primary Examiner* — Helena Kosanovic
*Assistant Examiner* — Tiffany T Tran
(74) *Attorney, Agent, or Firm* — Quarles & Brady LLP

(57) ABSTRACT

A coffee dose adjustment tool has interchangeable or adjustable blades for adjustment of the coffee fill height within a portafilter dosing tool.

14 Claims, 6 Drawing Sheets

(58) Field of Classification Search
CPC ............... A47G 23/04; A47G 23/0616; A47G 23/0633; A47G 23/0641; B65D 25/28; B26B 5/001
USPC ..... 15/236.05, 245.1; 99/285, 286, 279, 281, 99/287, 295, 300, 467, 477, 478, 479, 99/511, 513

See application file for complete search history.

(56) References Cited

U.S. PATENT DOCUMENTS

| | | | | |
|---|---|---|---|---|
| 5,492,054 | A * | 2/1996 | Schneeberger | A47J 31/3609 99/287 |
| 5,915,792 | A * | 6/1999 | Sakurai | B26B 1/048 30/161 |
| 6,095,032 | A | 8/2000 | Barnett et al. | |
| 6,192,786 | B1 * | 2/2001 | Gasser | A47J 31/0647 99/319 |
| 6,467,174 | B1 * | 10/2002 | Kotori | B26B 29/06 30/293 |
| 6,796,033 | B2 * | 9/2004 | Owoc | B26B 5/001 30/162 |
| 7,472,592 | B2 * | 1/2009 | Ban | G01F 1/684 73/204.26 |
| 8,240,244 | B2 | 8/2012 | McKnight | |
| 2004/0123747 | A1 * | 7/2004 | Lassota | A47J 31/42 99/510 |
| 2007/0119056 | A1 * | 5/2007 | Polei | B26B 5/003 30/162 |
| 2008/0050480 | A1 * | 2/2008 | Doglioni Majer | A47J 31/3609 426/231 |
| 2008/0282547 | A1 * | 11/2008 | Leger | B26B 1/08 30/162 |
| 2010/0050881 | A1 * | 3/2010 | McKnight | A47J 31/0657 99/289 R |
| 2012/0070546 | A1 * | 3/2012 | Tanja | A47J 31/42 426/115 |
| 2013/0056567 | A1 * | 3/2013 | Lee | A47J 42/02 241/24.26 |
| 2014/0021221 | A1 * | 1/2014 | Derby | B65D 21/08 222/95 |
| 2014/0150667 | A1 * | 6/2014 | Liao | A47J 31/20 99/323 |
| 2020/0276722 | A1 * | 9/2020 | Zhou | B26B 5/003 |

FOREIGN PATENT DOCUMENTS

| | | | |
|---|---|---|---|
| CN | 201178983 | Y | 1/2009 |
| CN | 101502385 | A | 8/2009 |
| CN | 101602120 | A | 12/2009 |
| CN | 101726289 | A | 6/2010 |
| CN | 101750220 | A | 6/2010 |
| CN | 101801245 | A | 8/2010 |
| CN | 202341778 | U | 7/2012 |
| CN | 204105757 | U | 1/2015 |
| CN | 204600040 | U * | 9/2015 |
| EP | 0117583 | A1 | 9/1984 |
| EP | 2087818 | A1 | 8/2009 |
| WO | WO-2008/067590 | A1 | 6/2008 |

OTHER PUBLICATIONS

Original CN-204600040-U (Year: 2015).*
Integral Definition & Meaning _ Dictionary.com (Year: 2016).*
Examination Report issued in Australian Patent Application No. 2015226836, dated Jan. 4, 2019.
"Barista Tools: Scottie Callaghan Dosing Tool," retrieved from the Internet Nov. 9, 2018, http://web.archive.org/web/20080130075208/http://www.scottiecallaghan.com/tools.html—published on Jan. 30, 2008 as per Wayback Machine.
Office Action issued in CN 201580012147.5, dated Sep. 6, 2018.
Extended European Search Report for European Patent Application No. 15758360.0, dated Dec. 20, 2017.
International Search Report and Written Opinion for PCT/AU2015/000131, dated Apr. 28, 2015.
International Preliminary Report on Patentability for PCT/AU2015/000131, dated Sep. 6, 2016.
Second Office Action issued in Chinese Patent Application No. 201580012147.5, dated May 8, 2019.

* cited by examiner

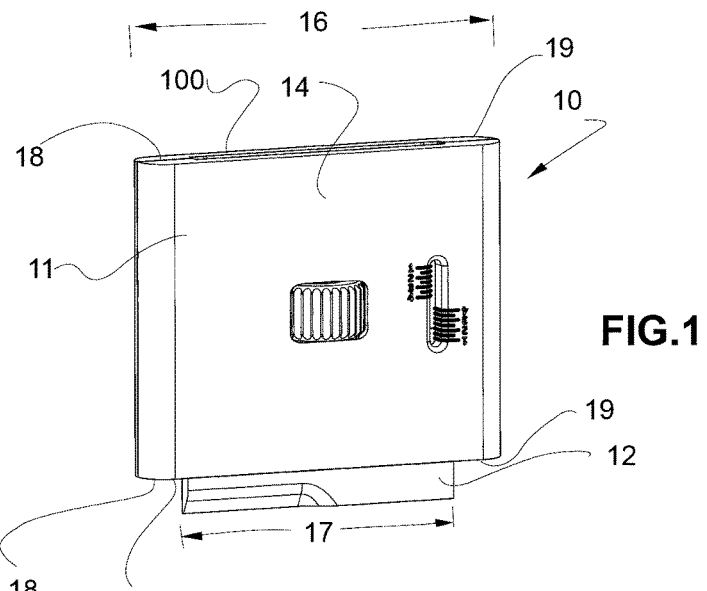
FIG.1
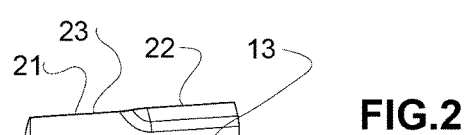
FIG.2
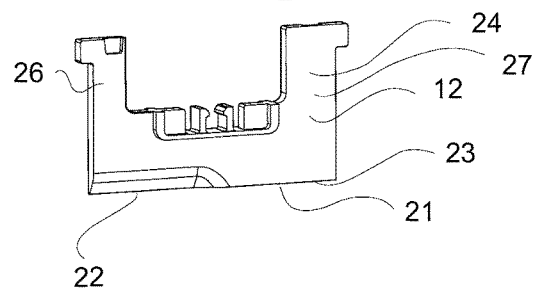

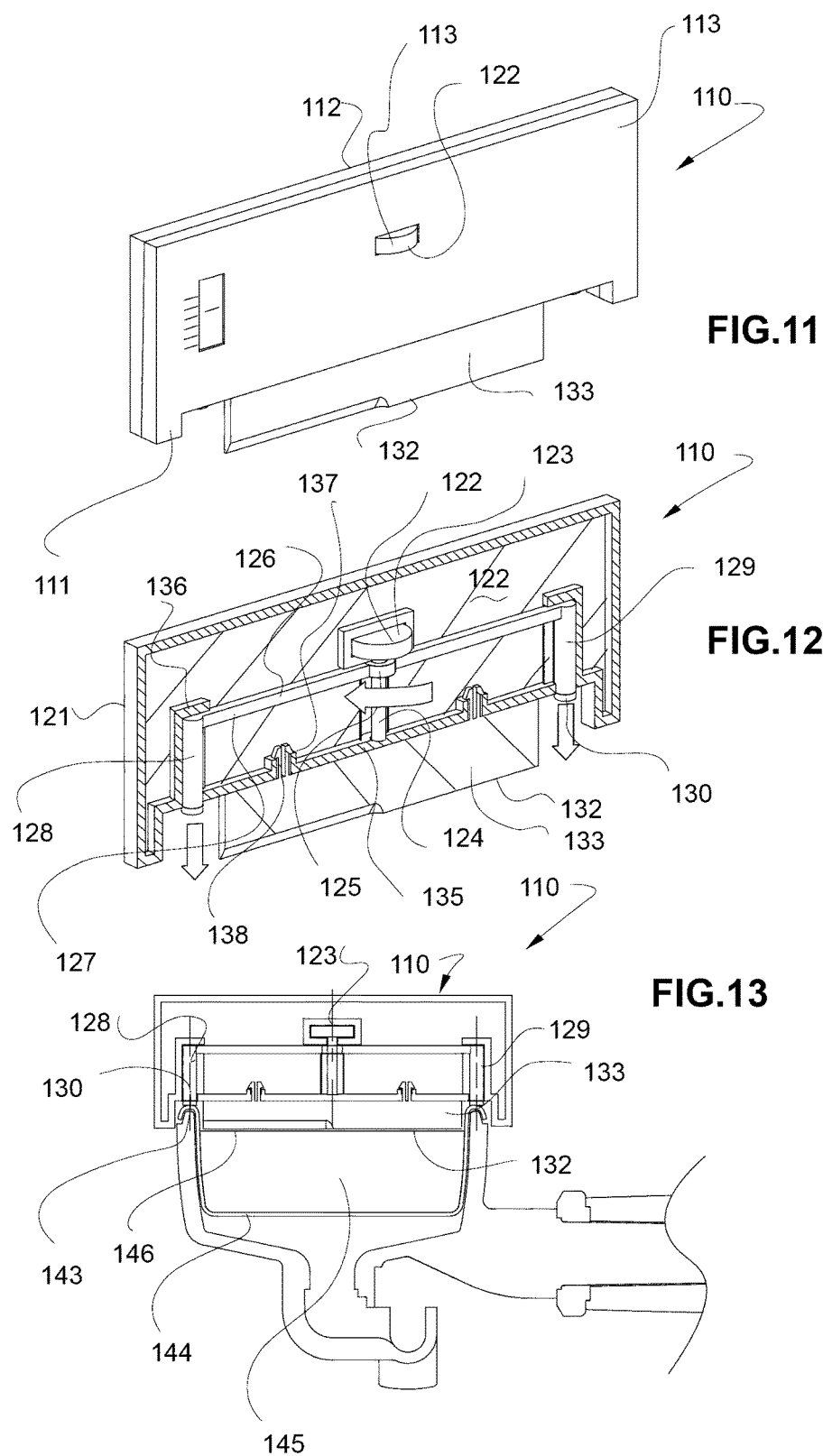

DOSING TOOL

FIELD OF THE INVENTION

The invention relates to coffee dosing tools and more particularly to a portafilter dosing tool with interchangeable or adjustable blades.

BACKGROUND OF THE INVENTION

Espresso machines use a portafilter or portafilter with an interchangeable basket for the purpose of containing ground coffee during an extraction process. The internal diameter of the portafilter in conjunction with the depth and density of the ground coffee in the portafilter determines the dose or mass contained in the portafilter. Ground coffee is tamped into the portafilter to arrive at a preferred depth or fill height. The fill height is an important parameter in the preparation of an espresso. Because of the importance of the fill height, a dosing tool is required that allows the user to accurately and repeatedly finish or trim a tamped portafilter to the appropriate fill height.

OBJECTS AND SUMMARY OF THE TECHNOLOGY

It is an object of the technology to provide a portafilter dosing tool with an adjustable or interchangeable blade.

It is another object of the technology to provide a portafilter dosing tool having a fill height indicator.

It is yet another object of the invention to provide a portafilter dosing tool having two blades, one of which is interchangeable with a third blade.

It is a further object of the invention to provide a portafilter dosing tool having an adjustable blade, an indexing feature with tactile feedback and a fill height indicator.

Accordingly, there is provided a portafilter dosing tool having a case within which is contained one, or a pair of blades. The case has a window through which an indexing mark can be viewed, the indexing mark being related to the desired fill height of a portafilter.

BRIEF DESCRIPTION OF THE DRAWING FIGURES

In order that the invention be better understood, reference is now made to the following drawing figures in which:

FIG. 1 is a perspective view of a dosing tool.

FIG. 2 is an exploded perspective view of a dosing tool depicted in FIG. 1.

FIG. 11 is a perspective view of an adjustable dosing tool.

FIG. 12 is a perspective view of the device depicted in FIG. 11 with one case half removed to expose the interior.

FIG. 13 is a cross-sectional view of the tool shown in FIG. 11 together with a portafilter.

BEST MODE AND OTHER EMBODIMENTS

Figure 3:
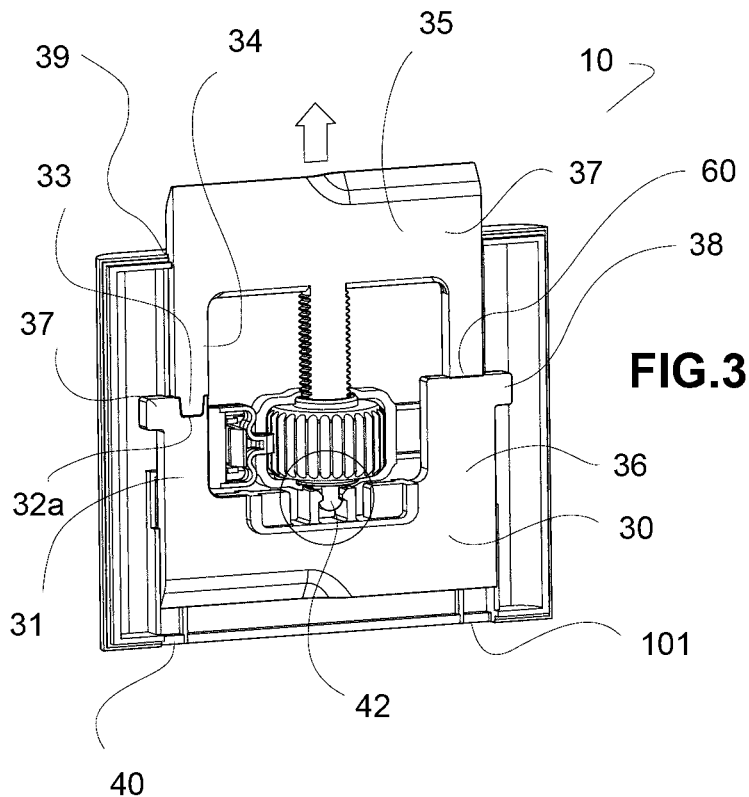
FIG. 3 is a perspective view of a dosing tool with one case half removed.

As shown in FIGS. 1 and 2, a manual dosing or dose adjustment tool for a portafilter 10 comprises a two part case 11 within which are located a pair of opposing blades 12, 13. In this example, the case or holder is composed of two similar case halves 14, 15. The case halves, when joined, form a slot 100, 101 at each end through which each of the opposing blades can protrude. The case halves snap together or are adhered to one another as suggested in FIG. 1. A two part case or holder is not essential. The transverse width 16 of the case is wider than the transverse width 17 of either of the blades 12, 13. Thus, when a blade is inserted into an open mouth of a portafilter, the end surfaces 18, 19 of the case will come to rest on the upper edges of the portafilter and the adjacent blade (e.g. 12) will penetrate into the portafilter by a penetration or depth that can be adjusted, as will be explained. In the examples provided, each blade comprises a trimming or scraping edge 21 that is preferably subdivided to provide one bevelled edged that is contiguous with one surface of the blade and a second bevelled edge 23 that is contiguous with the other face 24 of the blade. The bevel provides an optimised smoothing or scraping surface as the tool 10 is supported by the portafilter and manually rotated with respect to the portafilter.

As suggested by the example of FIG. 2, each of the oppositely directed or opposing blades is preferably flat and incorporates oppositely bevelled half-edges as previously described. The width of a particular blade edge 21 corresponds to a portafilter of a particular and cooperating nominal internal diameter. Each blade has a pair of parallel limbs 24, 25, 26, 27 that extend away from the scraping edge 21. One blade has a central stem 28 that carries threads 29 that cooperate with female threads 30 located within an indexing wheel 31. The indexing wheel 31 preferably features a fluted, textured or scalloped exterior diameter 32 that cooperates with a pawl 33. Each of the case halves 14, 15 has a central window 34, 35 with an optional internally thickened rim through which the indexing wheel 31 can be accessed and rotated by the user. The indexing pawl 33 is retained between the case halves 14, 15. As will be explained, rotation of the indexing wheel 31 causes the pair of blades to move in unison and in the same direction. The extent of movement can be viewed through a window 36 formed through at least one of the case halves 14. Raised or other optional index marks 37, 38 adjacent to the window 36 allow the user to view a mark, seam or joint between the attached blades and thereby gauge the depth of penetration of the exposed blade.

FIG. 3 illustrates the dosing tool 10 with one of the case halves 14 removed. The two blades are removably interlocked, thus stabilising their relative orientation within the case. In the example of FIG. 3, the lower blade 30 has one limb 31 having at its extremity, on one side a recess 32*a*. The recess 32*a* accommodates a tongue 33 formed at the extremity of a limb 34 of the other blade 35. A similar arrangement optionally interconnects the other limbs 36, 37. In this example, the recess and tongue arrangement 32, 33 is provided on each limb pair, but on opposing side faces of each blade. In this example, the terminal end of each limb 31, 36 of the lower blade 30 features a pair of laterally extending ears or tabs 37, 38. The ears protrude so that the lower blade cannot pass through the slot or opening in the tool body for the lower blade. The case half features upper and lower half slots 39, 40 through which each blade is adapted to protrude.

Figure 4:
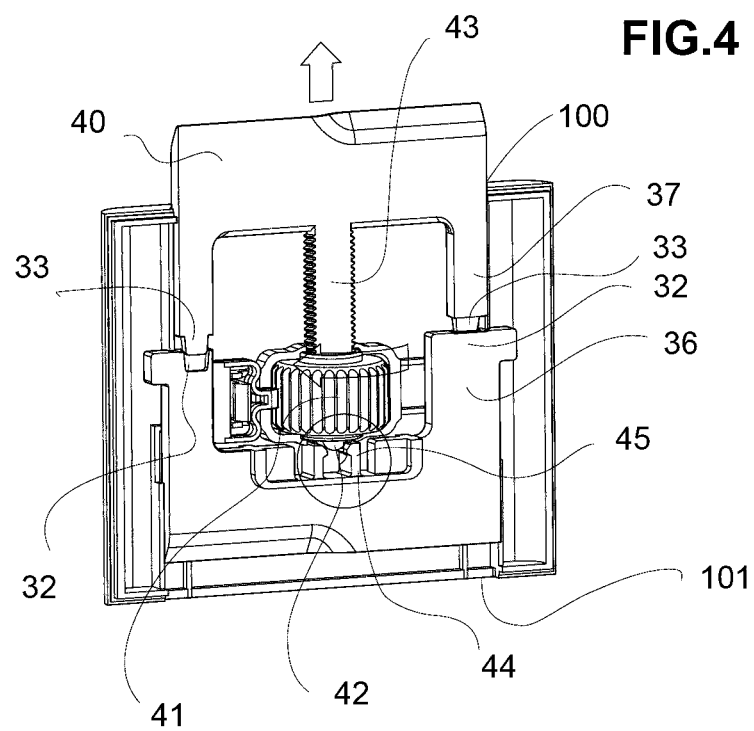
FIG. 4 is a perspective view of a dosing tool with one case half removed.

As suggested by the example of FIG. 4, advancement of the upper blade 40 by the indexing wheel 41 eventually causes the disengagement of an enlarged head 42 formed at one end of the stem 43 with the resilient retaining clamp 44 that is integral with one of the case halves. The clamp 44 is formed from two resilient fingers 45, each having terminal protrusion that engage and disengage with the groove 51 (see FIG. 5) located adjacent to the head 42. When the head 42 is ejected from the clamp 44, the upper blade 40 can be manually withdrawn from the case. This allows the same or a different blade to be reinserted into engagement with the indexing wheel 41. Portafilters are known to have different internal or mouth diameters. Thus by using two blades of different length, and providing for interchangeable blades, many different portafilters may be accommodated.

Figure 5:
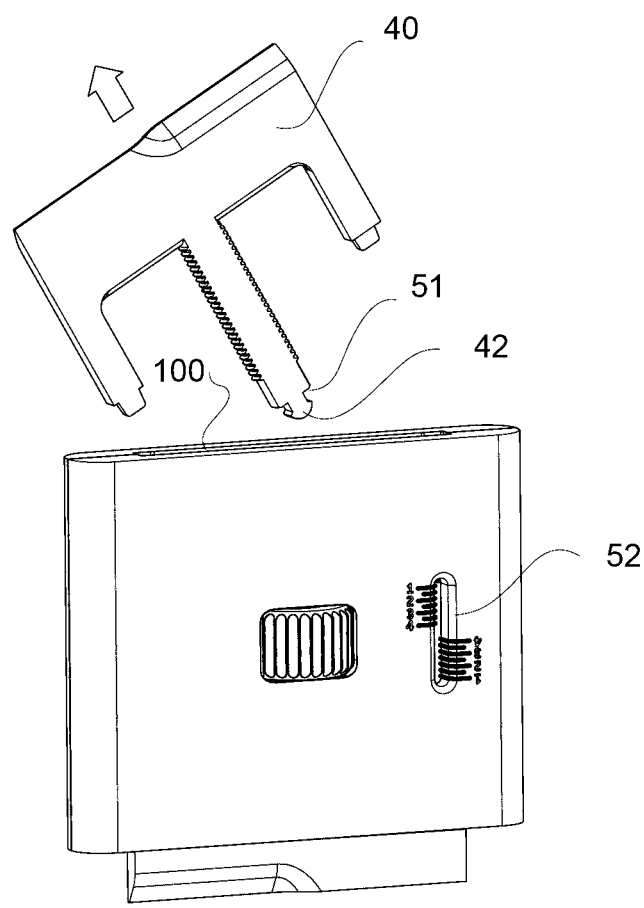
FIG. 5 is a perspective view of the dosing tool with one blade removed.
Figure 6:
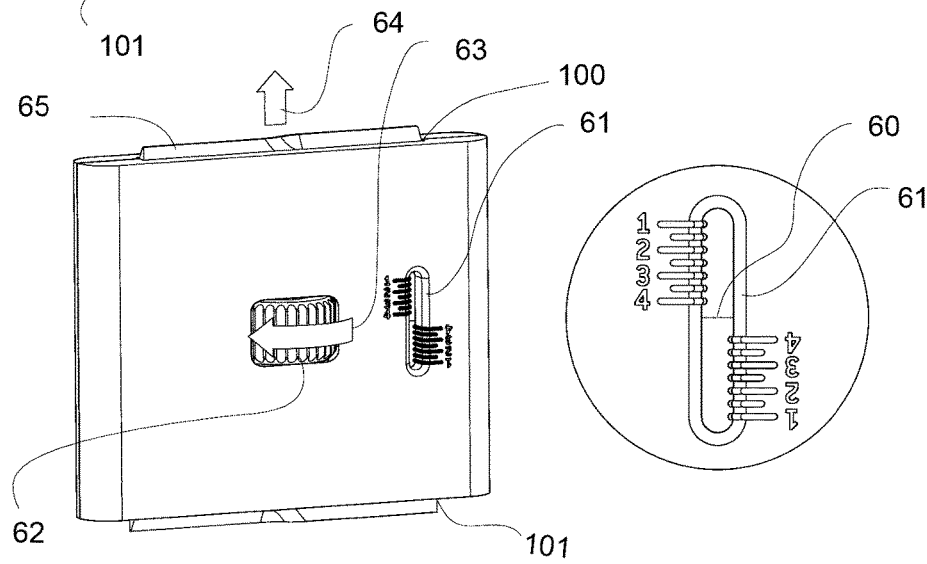
FIG. 6 is a perspective view of a dosing tool and a view window.

As suggested by FIGS. 2 and 5, the two reciprocating and opposite facing blades define a joint or edge 60 that is visible through the window 36, 52. Accordingly, and as illustrated in FIG. 6, the joint or edge 60 will appear centred in the window 61 when the pair of blades is centred. Rotating the indexing wheel 62 in one direction 63 causes an advancement 64 of one of the blades 65. As the blade is advanced or retracted by the index wheel, the joint or edge 60 will appear to move whereupon the user can cease rotation of the index wheel when the joint or edge 60 is adjacent an appropriate index mark 71 (as shown in FIG. 7).

Figure 8:
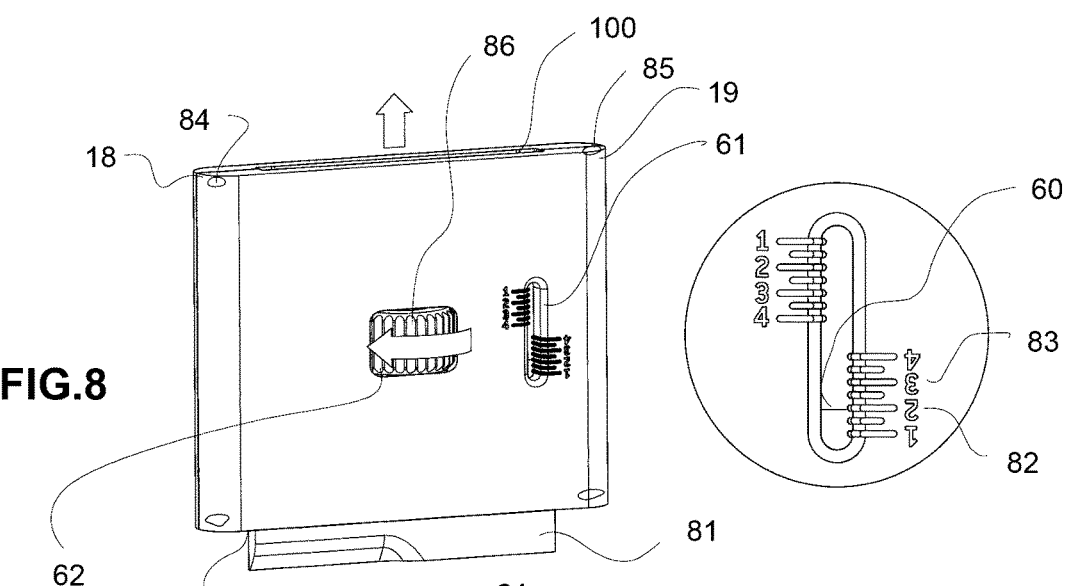
FIG. 8 is a perspective view of a dosing tool and a view window.
Figure 7:
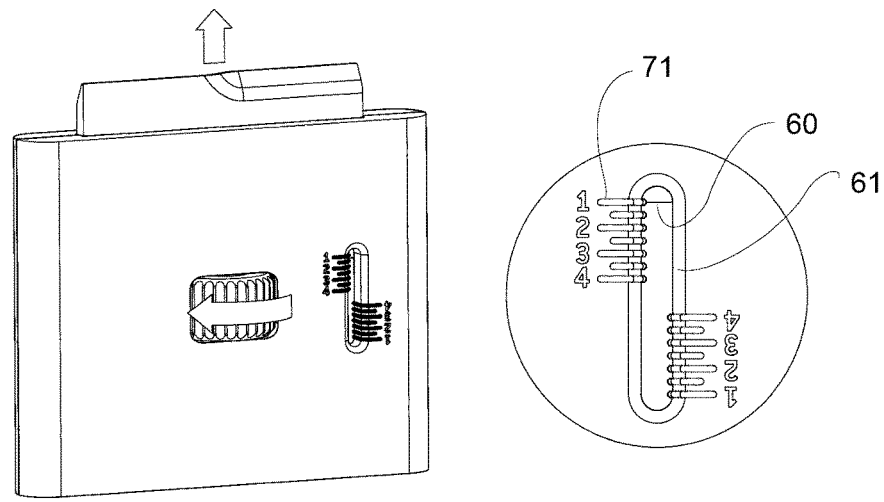
FIG. 7 is a perspective view of a dosing tool and a view window.

As suggested by FIGS. 6-8, rotation of the indexing wheel 62 in an opposite direction will cause advancement of the other blade 81 and a corresponding movement of the joint or edge 60 into alignment with one of the index marks 82 of the other group or set 83 of index marks that appear adjacent to the window 61. Each of the index marks correspond to a depth of penetration of the blade past the upper rim of the portafilter. In order to facilitate more positive feel or location of the case with respect to the portafilter, the case may contain magnets 84, 85 adjacent to the shoulders 18, 19 formed by the case near the terminal end of each of the blade slots. In preferred embodiments, the spacing of the scallops or parallel grooves or indexing features 86 of the index wheel correspond to an advancement of a blade by a distance that corresponds to a spacing between adjacent index marks 82, or a rational subdivision thereof, such as one quarter or one half.

Figure 9:
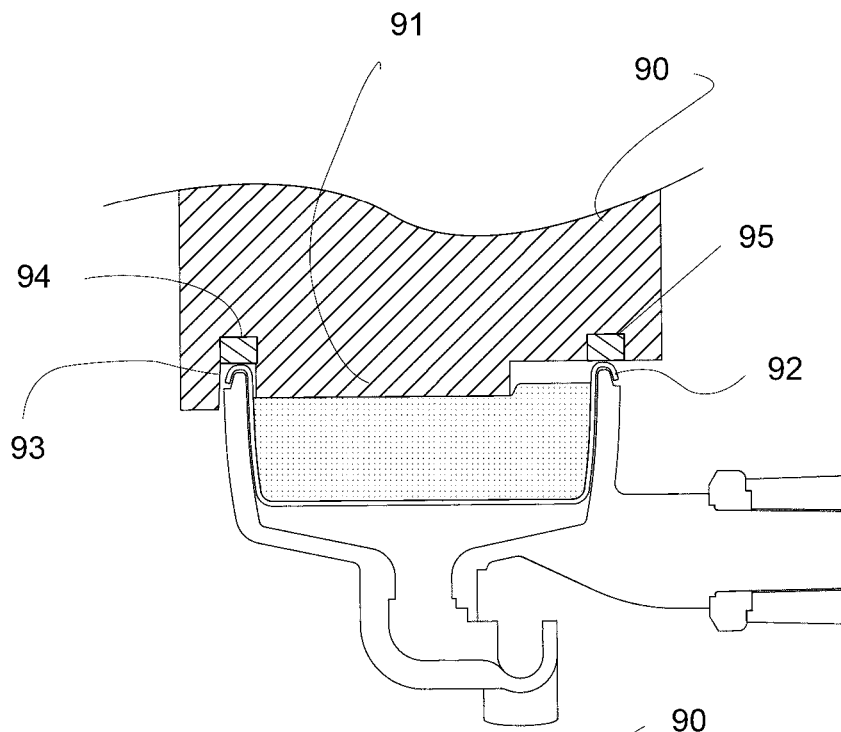
FIG. 9 is a cross-sectional view of a dosing tool and portafilter.
Figure 10:
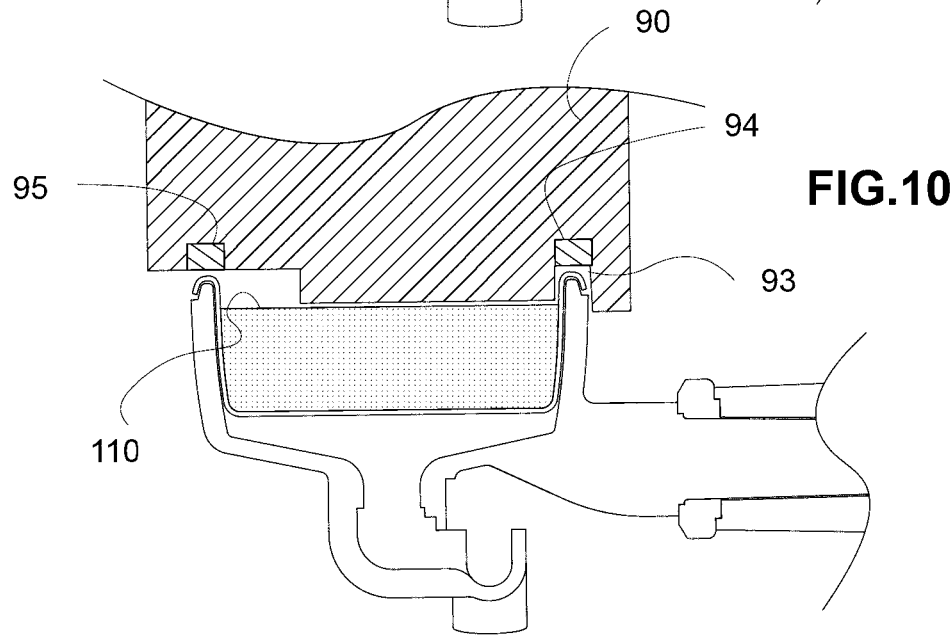
FIG. 10 is a cross-sectional view of a dosing tool and portafilter.

As shown in FIG. 9, a dosing tool 90 as previously described can incorporate blades 91 having a blade width that is less than the internal diameter of the portafilter or its basket 92. When the width of the blade is less than the internal diameter of the portafilter or its basket 92, it is sometimes preferred to incorporate a rim engaging slot 93 into the tool 90. The rim engaging slot 93 ensures the correct position of the tool and it's blade as it is rotated with respect to the portafilter. To facilitate even better engagement, one or more magnets 94, 95 may be incorporated into the tool in, or near, or in place of the slot. Magnetic attraction between the one or more magnets 94, 95 keeps the tool in engagement with the upper rim of the portafilter or its basket 92. In this example, one magnet 94 is located within the rim engaging slot 93 and the other magnet 94 is located a distance apart from the first magnet 94 that corresponds to the diameter of the upper rim of the portafilter or its basket 92. As shown in FIG. 10, rotation of the tool 90 smooths the upper surface 110 of the coffee within the portafilter, the rim engaging slot 93 maintaining its engagement with the rim of the portafilter.

The total width of a blade 91 is considered effective so long as it is at least one half the diameter of the portafilter or its basket 92.

Another embodiment of an adjustable dosing tool is illustrated in FIGS. 11-13. In this example, the adjustable manual dosing tool 110 comprises an enclosure in formed from two mating case halves 112, 113. A single case half or holder an also support all of the moving parts. As shown in FIG. 12, each case half has a peripheral rim 121, that when joined to one another they form an interior compartment 122. The holder or the two halves of it 112, 113 retain a freely rotating adjustment screw 122. In this example, the adjustment screw 122 compromises a rotating head 123 and a threaded shaft 124 that are retained by the holder. The threaded shaft 124 passes through and engages with cooperating threads formed on a central boss 125 of a reciprocating height adjustment frame 126. The adjustment frame 126 has a horizontal cross bar 127 that interconnects a pair of adjustment posts 128, 129 and that moves within the case. The lower or contact end of each adjustment post (being the lowest terminal points of the frame 126) 128, 129 may terminate in, for example, a low friction material or a magnetic material 130. When the thumb screw 123 is rotated, the horizontal crossbar 126 moves vertically together with the adjustment posts 128, 129. This has the effect of altering the vertical distance between the portafilter contacting surface 130 and the lower edge 132 of the scraper blade 133.

A lower end of the adjustment shaft 124, may be rotatably retained by an opening in a lower horizontal rim of a case halve 135.

Internal ribs, fillets or rims 136 of a case halve are used to guide the vertically adjustable cylindrical posts 128, 129 within the case.

A lower margin of a case halve may have one or more optional openings 137 for receiving one or more fasteners 138 that are carried by an upper edge of the scraper blade 133. In this way the scraper blade, 133 can be disengaged from the case and interchanged with a scraper blade 133 having different characteristics, a different width etc. The blade may be integral with the holder or removable. In this way the blade extends away from the holder.

Shown in FIG. 13, the portafilter contacting ends or surfaces 130, being the lower ends of the adjustment post 128, 129 make contact with the upper rim 143 of a portafilter or a portafilter insert 144. When the tool 110 is rotated, the level of the coffee 145 in the portafilter is adjusted and the upper surface of the coffee 146 is flattened and smoothed by the tool.

Although the invention has been described with reference to specific examples, it will be appreciated by those skilled in the art that the invention may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller or computing system, or similar electronic computing or signal processing device, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

While the present invention has been disclosed with reference to particular details of construction, these should be understood as having been provided by way of example and not as limitations to the scope or spirit of the invention.

What is claimed is:

1. A manual coffee dose adjustment device, comprising:
a first adjustable blade and a second adjustable blade, wherein the blades are opposing and removably interlocked by a cooperating and rotating index wheel;
a holder for the first adjustable blade and the second adjustable blade, wherein the first adjustable blade and the second adjustable blade are configured to adjust a coffee fill height within a portafilter;
the first adjustable blade having an integrally formed central stem having a threaded portion;
the threaded portion being received by the cooperating and rotating index wheel, wherein rotation of the index wheel adjusts an amount by which the first adjustable blade protrudes from the holder;
the index wheel being retained by the holder;
wherein the holder includes a case that contains the first adjustable blade; and
wherein the case comprises two halves.

2. The device of claim 1, wherein:
the first blade has two faces and two bevelled edges, one edge contiguous with one face and the other edge contiguous with the other face.

3. The device of claim 1 further comprising:
an index mark adjacent to a view window.

4. The device of claim 1, wherein:
the index wheel has a textured exterior and is associated with a pawl that cooperates with the textured exterior.

5. The device according to claim 4, wherein the indexing pawl is retained inside two halves of the case.

6. The device according to claim 1, wherein an enlarged head is formed at one end of the central stem, and a groove is formed between the threaded portion and the enlarged head.

7. The device according to claim 6, wherein:
the second adjustable blade further comprises two parallel limbs, each parallel limb of the second adjustable blade further comprises a laterally extending tab to prevent the second blade from passing through a lower slot in the case.

8. The device according to claim 7, wherein the second adjustable blade further comprises a resilient retaining clamp formed between the two parallel limbs of the second adjustable blade to reversibly engage with the groove, the resilient retaining clamp comprises two resilient fingers, wherein each resilient finger comprises a terminal protrusion.

9. The device according to claim 1, wherein:
the first adjustable blade and second adjustable blade are arranged to protrude from slots at opposite ends of the case.

10. The device according to claim 1, wherein the first adjustable blade and the second adjustable blade comprise respective scraping edges that further comprises a first bevelled edge that is contiguous with a first face of each blade and a second bevelled edge that is contiguous with a second face of each blade.

11. The device according to claim 10, wherein the scraping edge of the first adjustable blade extends toward a first end portion of the case and the scraping edge of the second blade extends toward an opposite end portion of the case.

12. The device according to claim 10, wherein the first adjustable blade further comprises two parallel limbs, wherein each of the two parallel limbs comprise a tongue formed at an extremity of each of the two parallel limbs, and wherein the second adjustable blade further comprises two parallel limbs extending from the scraping edge of the second adjustable blade toward the opposite direction of the scraping edge, and each of the two parallel limbs comprise a recess to receive the tongues to interconnect the first adjustable blade and the second adjustable blade, the two recesses are located on opposing side faces of the second adjustable blade, each parallel limb of the second adjustable blade further comprises a laterally extending tab to prevent the second blade from passing through a lower slot in the case.

13. The device according to claim 12, wherein the case abuts the parallel limbs of the first adjustable blade and the second adjustable to retain the parallel limbs parallel to the holder.

14. The device according to claim 1, wherein rotation of the index indexing wheel causes the first adjustable blade and the second adjustable blade to move in unison and in the same direction.

* * * * *

UNITED STATES PATENT AND TRADEMARK OFFICE
CERTIFICATE OF CORRECTION

| | |
|---|---|
| PATENT NO. | : 11,779,151 B2 |
| APPLICATION NO. | : 15/123672 |
| DATED | : October 10, 2023 |
| INVENTOR(S) | : Simon James Chalk et al. |

It is certified that error appears in the above-identified patent and that said Letters Patent is hereby corrected as shown below:

In the Specification

Column 4, Line 6, "enclosure in formed" should be --enclosure 111 formed--.

In the Claims

Claim 14, Column 6, Line 62, "index indexing" should be --index--.

Signed and Sealed this
Twentieth Day of February, 2024

Katherine Kelly Vidal
*Director of the United States Patent and Trademark Office*